US008117131B2

(12) United States Patent
Boozer

(10) Patent No.: US 8,117,131 B2
(45) Date of Patent: Feb. 14, 2012

(54) DISTRIBUTED TECHNOLOGY TRANSFER DEPARTMENT

(75) Inventor: Tanaga Anne Boozer, Tallahassee, FL (US)

(73) Assignee: Florida Agricultural and Mechanical University, Tallahassee, FL (US)

( * ) Notice: Subject to any disclaimer, the term of this patent is extended or adjusted under 35 U.S.C. 154(b) by 664 days.

(21) Appl. No.: 11/681,517

(22) Filed: Mar. 2, 2007

(65) Prior Publication Data

US 2007/0203737 A1 Aug. 30, 2007

Related U.S. Application Data

(63) Continuation-in-part of application No. 11/049,265, filed on Feb. 2, 2005, now abandoned.

(60) Provisional application No. 60/778,829, filed on Mar. 2, 2006.

(51) Int. Cl.
G06Q 10/00 (2006.01)
G06Q 50/00 (2006.01)

(52) U.S. Cl. ......................................... 705/310; 705/1.1

(58) Field of Classification Search ................ 705/1, 1.1, 705/37, 38
See application file for complete search history.

(56) References Cited

U.S. PATENT DOCUMENTS

| 6,470,338 | B1 * | 10/2002 | Rizzo et al. ........................ 1/1 |
| 6,654,767 | B2 * | 11/2003 | McAnaney et al. ................. 1/1 |
| 7,096,193 | B1 * | 8/2006 | Beaudoin et al. ............... 705/26 |
| 7,653,551 | B2 * | 1/2010 | Poltorak ......................... 705/1.1 |
| 2001/0032094 | A1 * | 10/2001 | Ghosh et al. ....................... 705/1 |
| 2002/0059076 | A1 * | 5/2002 | Grainger et al. .................. 705/1 |
| 2003/0149557 | A1 * | 8/2003 | Cox et al. ......................... 704/2 |
| 2003/0200168 | A1 * | 10/2003 | Cullen et al. .................... 705/37 |
| 2004/0236734 | A1 * | 11/2004 | Yip et al. .......................... 707/3 |
| 2005/0240428 | A1 * | 10/2005 | Gabrick et al. ................... 705/1 |
| 2007/0016431 | A1 * | 1/2007 | Desai et al. ....................... 705/1 |
| 2007/0038566 | A1 * | 2/2007 | Shestakov et al. .............. 705/44 |
| 2007/0124166 | A1 * | 5/2007 | Van Luchene .................... 705/1 |

\* cited by examiner

Primary Examiner — Jami A Plucinski
Assistant Examiner — Sangeeta Bahl
(74) Attorney, Agent, or Firm — Parks IP Law LLC; Cynthia Parks, Esq.

(57) ABSTRACT

An online, and therefore distributed, technology transfer department accessible by multiple inventive entities is provided. The systems and methods of the invention provide a comprehensive interface to a remote application that collects information related to inventions, ranks the inventions, solicits approval for pursuing intellectual property protection, funding, financing, commercializing or otherwise exploiting the invention, solicits bids from a stable of service providers, manages the award of contracts to provide services, facilitates collaboration between users internal and external to the inventive entities and between different entities, implements security protocols, and reports government funded inventions to the appropriate regulatory agencies, and manages intellectual property portfolios. Each inventive entity may specify the level of control to be retained to utilize the distributed technology office application as a supplement for or as a substitute for full time technology transfer personnel.

8 Claims, 12 Drawing Sheets

DISTRIBUTED TECHNOLOGY TRANSFER DEPARTMENT

CROSS-REFERENCE TO RELATED APPLICATIONS

This application (1) is a continuation-in-part of U.S. patent application Ser. No. 11/049,265, filed Feb. 2, 2005 now abandoned; and (2) claims priority to U.S. Provisional Application No. 60/778,829 filed Mar. 2, 2006. Both applications are hereby incorporated herein by reference.

STATEMENT REGARDING FEDERALLY SPONSORED RESEARCH OR DEVELOPMENT

This invention was made with government support under a grant from the National Science Foundation, Grant Nos. 0438670 and 0638076. The U.S. Government has certain rights in this invention.

BACKGROUND OF THE INVENTION (1) Technical Field

The present invention pertains to systems and methods for cooperatively managing and processing intellectual property transactions.

(2) Description of the Related Art

Numerous universities, hospitals, non-profit organizations, research laboratories and similar inventive entities develop significant intellectual property but are faced with severe limitations in resources needed to protect, commercialize and manage that property. Most commonly, the most onerous limitation is insufficient funding to staff and equip a technology transfer department with the professionals and tools necessary to coordinate establishment of rights, including patents, trademarks, and copyrights, enforcement of those rights, and exploitation of the commercial and societal potential of the intellectual property.

Without sufficient funding, inventive entities are often unable to create an infrastructure that fosters and stimulates innovation in the organization. When innovation occurs, some inventive entities have internal Technology Transfer Departments (TTDs) that are responsible for analyzing the potential value of the innovation, determining the applicable and practical modes of protection available, securing professional expertise to parlay the innovation into intellectual property rights, licensing the rights or converting the innovation into usable products, services or systems. Once the value of the intellectual property has been mined, the TTD is faced with managing the portfolio of intellectual property, including administering license agreements, collecting royalties, overseeing foreign prosecution, and paying annuities to maintain protection in various jurisdictions. The mandate of the TTD is daunting and success is determined by how effectively it can forecast and coordinate hundreds of meticulous tasks and considerations.

One approach to address this situation is to create an online tool that automates many of the functions typically performed by a TTD. For instance, an inventive entity may provide online access to its invention disclosure form (IDF) to eliminate the need for TTD personnel to continually respond to requests for the latest version of the IDF. The IDE may be posted on a web site and downloaded as needed by inventors. Going a step further, the TTD may provide an online utility that allows for automatic upload of the completed form from the inventor to the TTD. This file transfer utility can be used to download and upload any number of the various forms used by a TTD, such as patent application templates, confidentiality agreements, licensing agreements, and joint research agreements. The TTD may manually or automatically analyze the viability or commercial potential of the innovation disclosed, and may then use the automated system to provide feedback to the inventor or to other entities as appropriate. The TTD still must piece together various steps of the process to manage the entire process, including filing of applications to protect the intellectual property.

Obviously, it is extremely desirable for such an online tool to provide tight security to prevent inadvertent or malicious disclosure of the potentially valuable information communicated using the online tool. Furthermore, different TTDs have differing practices, forms, evaluation criteria, strategies, and objectives. Hence, each inventive entity will typically develop and implement its own tool, and limit its access to its own administrators, employees, students, and inventors. Consequently, even with the availability of online tools, the inventive entity still needs its own staff to administer the entire process.

There is a need, therefore, for systems and methods that enable an inventive entity to implement a fully functional TTD with little regard to the level of resources available to that inventive entity.

BRIEF SUMMARY OF THE INVENTION

The present invention addresses the shortcomings of the prior art by providing a distributed technology transfer department (DTTD) that functions as a clearinghouse, a portal, and a portfolio management system for the acquisition and supply of services related to the innovations of multiple inventive entities, such as universities, small businesses, corporations, entrepreneurs, SBIR/STTR grantees, economic development organizations, research organizations, and federal laboratories.

Generally described, the DTTD is a comprehensive system that includes both hardware and software. The software, hereinafter referred to as the DTTD application, operates at one or more centrally located nodes in a globally accessible network, such as the Internet. In the exemplary embodiments, the DTTD application operates on a central computing device, hereinafter referred to as a server, which is accessed via the Internet by any number of remote computing devices operated by users associated with multiple related or unrelated inventive entities. It will be recognized that a single server may include multiple pieces of equipment, and as such, the term server is used in its functional context and should not be limited to a single computer or set of peripheral devices. The DTTD application generates a portal that facilitates interaction between the user and the DTTD. The portal is in the form of a web site that includes multiple web pages and links to other web sites, databases, document stores, and the like. Each page of the web site provides one or more functions, including presentation of information, collection of information, and manipulation of information.

In certain embodiments, the interface includes an interactive pseudo human interface that more closely approximates conversational interaction as it presents or collects information. To that end, the interface may further be voice or touch enhanced or activated, and may generate and display images of human faces or figures to interact with users in what approximates an ongoing dialog with another person. This feature is designed to aid in providing users with the kind of personal assistance that humans provide to inventors, business people, students, scientists and the like. In certain embodiments, the user can select or create a suitable two or three dimensional graphical representation of him or her self (his or her avatar). The avatar can be customized to reflect the user's characteristics such as gender, race, age, voice, pitch and background. The background simulates or recreates the environment in which the meeting occurs, such as a research facility, a classroom, a professional office setting, a meeting over a meal or in a dormitory room, and the like.

One aspect of the invention involves the ability of the DTTD to provide the equivalent of technology transfer staff for multiple inventive entities that, for instance, have limited resources to support independent TTDs. To this end, the DTTD incorporates principles of scalability and variability that allow it to address the needs of multiple and potentially disparate entities. For example, although the DTTD application may operate on a single server, it can be accessed by more than one inventive entity. Each inventive entity may require its own "look and feel" for the interface, so that it appears to the users associated with that inventive entity that the interface is customized and solely intended for that inventive entity. Various inventive entities may utilize the entire DTTD as a subscription service on a flat fee or per transaction basis or each inventive entity may select certain of the DTTD modules as appropriate. One or more DTTD Administrators are able to manage the operation of the DTTD centrally thereby removing the onus from individuals associated with the inventive entities.

The DTTD performs many, if not all, of the functions of a well equipped TTD, including, but not limited to: dissemination of information and forms; promulgation and documentation of procedures; collection and tracking of information regarding innovation (such as invention disclosures); evaluation of innovation; approval processing; identification, evaluation and selection of service providers; document management; report generation; reporting of compliance or performance to regulators, investors, and shareholders; payment processing; accounting; reporting; calendaring; coordination between multiple entities; budgeting; and the like. Each inventive entity controls the level of interaction that it can provide to determine the level of autonomy that the DTTD will have to automatically manage transactions and make decisions. In this fashion, the DTTD can be utilized to ease the load of an existing TTD or to become the TTD for an inventive entity that does not have a TTO.

The DTTD provides multiple levels of security by user class, access group, role or user identity to control the information to which a particular user or class can access. For instance, inventors may have the ability to view and add certain information, such as their own invention disclosures, while a local administrator may be able to add, change or delete information having to do with multiple inventors. Users internal to the inventive entity possess different access authority (permissions), as compared to users external to the inventive entity, such as service providers (attorneys, accountants, potential licensees, and the like). The DTTD also partitions information by inventive entity to prevent users associated with one inventive entity from accessing information belonging to another inventive entity without authorization. At the same time, the DTTD can facilitate joint research and joint ventures between two or more inventive entities by providing access on a case by case (matter level) basis.

According to another aspect of the invention, the DTTD can offer various services to different kinds of users, such as but not limited to, general legal assistance, tax services, small business start-up services, automatic translational services, and technology transfer services.

According to another aspect of the invention, the DTTD provides a compliance module, which is particularly useful to apply for intellectual property protection and reporting compliance with regulations promulgated by the government. For instance, universities and other non-profit organizations that receive federal funds must satisfy the reporting requirements of the Bayh-Dole Act. As another example, the DTTD enables electronically filing of invention reports by linking directly to the electronic patent reporting services offered by federal agencies such as the National Institutes of Health (IEDISON) and NASA (ENTRE).

In certain embodiments of the invention, the DTTD processes electronic payments for services that are rendered through the system. The DTTD is designed to allow subscribers or individual to purchase services using any suitable form of electronically executable payment, such as but not limited to via credit, debit, electronic checks, wire, EFT, PAYPAL and the like.

In certain embodiments, the DTTD allows users to communicate in the language of their choice. Users are given the option to select their language of choice as they enter the DTTD. The DTTD is equipped with a translational program (voice and text) that allows users and service providers to interact with the system in their own language or the language of their choice. The benefit of this system is that the translations appear seamless and occur automatically when the recipient's and the user's language preferences are different.

The DTTD also includes a provider selection module that ensures users will have access to qualified, pre-selected attorneys, technology transfer experts, consultants, CPAs, patent agents, marketing experts, prototypers, draftsmen, and the like. Service providers may register with the DTTD to be included in the provider selection process; a subscription and/or a fee may be required. Based on predetermined criteria, the system is capable of ranking and/or selecting the qualified service providers for a given matter. Service providers are selected by the DTTD based on factors such as: reputation, certifications, industry rating (e.g., AV rating), capacity, technical expertise, experience, services offered, price, feedback from users, etc. Since the DTTD ranks the service provider, there may be an intermediary, or liaison, between the user and the service provider to help manage the system and guarantee quality service by competent providers. The provider selection module may also facilitate an on-line selection and/or bidding process. In cases where a service provider enters into an exclusive contract to provide services, the bidding process is irrelevant and becomes more of a selection of assignment of the actual provider within the service provider's firm.

According to yet another aspect of the invention, the DTTD enables online review, modification, and filing of applications, such as for intellectual property protection or for funding. Any such application can be outsourced to a service provider who drafts the application outside of the DTTD. After the application is drafted, the application can be uploaded to the DTTD system for appropriate action, such as review, modification, approval, filing, translation, linking, and the like. While the embodiments described herein make reference to patent applications, the DTTD facilitates associated online actions that are equally applicable any other similar transaction or service. The DTTD allows users to create and share certain documents while online. To accomplish the editorial function, the DTTD utilizes known or yet to be developed online document sharing and collaboration utilities.

The DTTD manages, integrates, and coordinates both documents and people. Therefore, it includes more than a standard intellectual property database management program, which typically performs primarily user driven document management functions. The DTTD is a system designed to automate technology transfer functions and to match subject matter experts to the appropriate service request from the user. Many of its functions are automated, and administration of the DTTD is performed centrally. For example, access levels and authorizations can be controlled and managed by the DTTD Administrator. Authorized users can submit a request for service to the DTTD, such as by uploading an invention disclosure form or by authorizing preparation of an application thereby triggering the DTTD, either automatically or via a notification to the DTTD Administrator, to check the budget and payment authorization prior to initiating the process of identifying and assigning the service provider to a particular project or invention disclosure. An inventive entity that desires more control, such as one that employs a Local Administrator, may override or assume authority for decisions that the DTTD can make automatically or via the DTTD Administrator. Alternatively, the inventive entity may institute additional controls, for example a "hold" that allows time to send the disclosure or service request to a committee for approval prior to allowing the DTTD to move forward with checking the budget or assigning the work to a service provider.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION OF THE DRAWINGS

FIG. 4 is an illustration of an interface for a TTO module, in accordance with certain exemplary embodiments of the invention.

FIG. 5 is an illustration of an interface for an inventor module, according to certain exemplary embodiments of the invention.

FIG. 6 is an illustration of an interface for submitting an electronic invention disclosure form, in accordance with certain exemplary embodiments of the invention.

Figure 8:
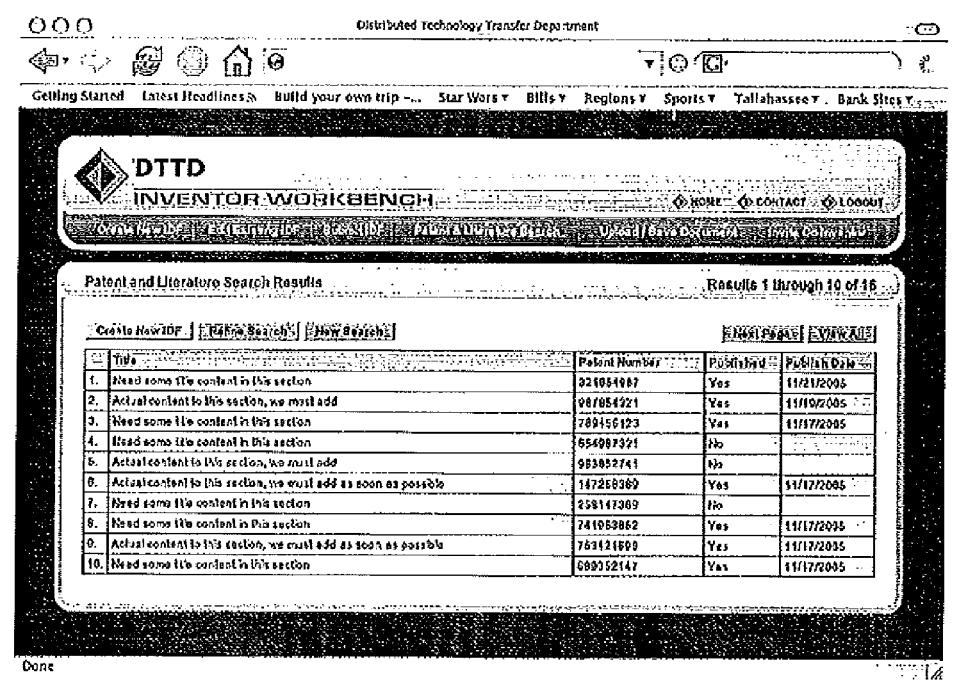

FIG. 8 is an illustration of an interface for displaying the results of an electronic patent and literature search, according to certain exemplary embodiments of the invention.

Figure 10:
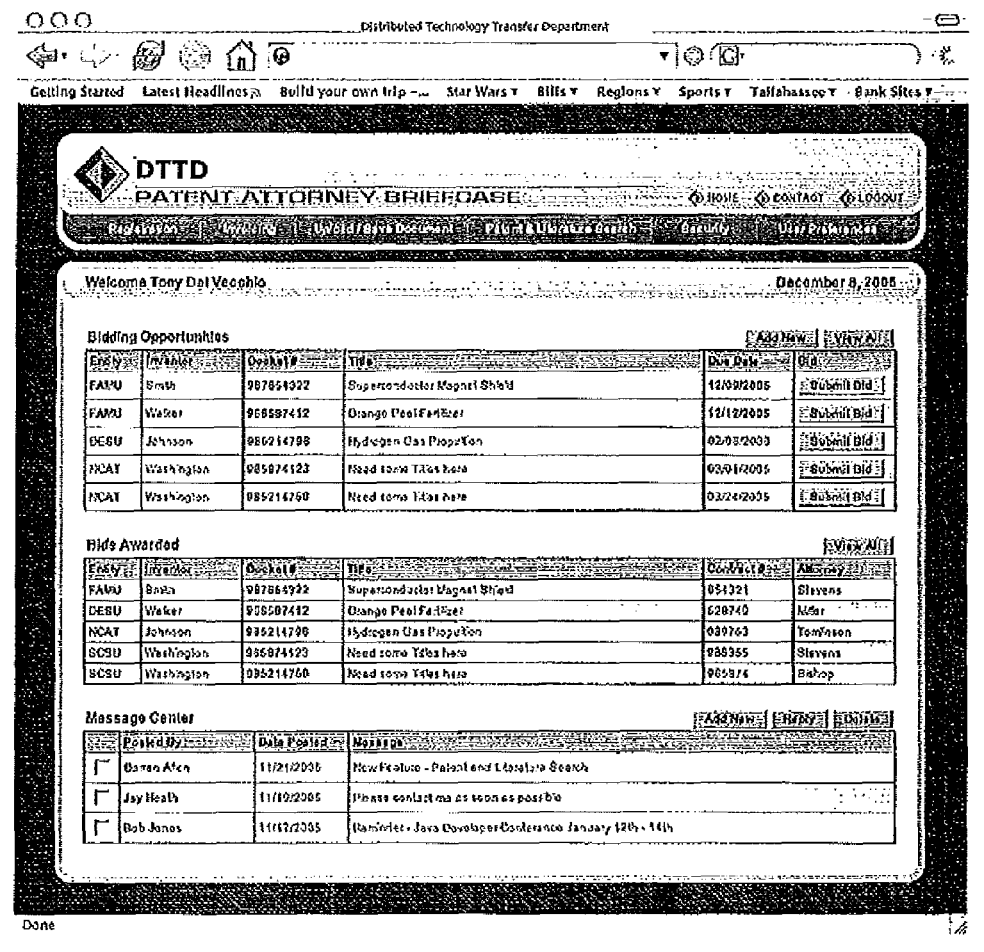

FIG. 10 is an illustration of an interface for a service provider module, in accordance with certain exemplary embodiments of the invention.

Figure 11A:
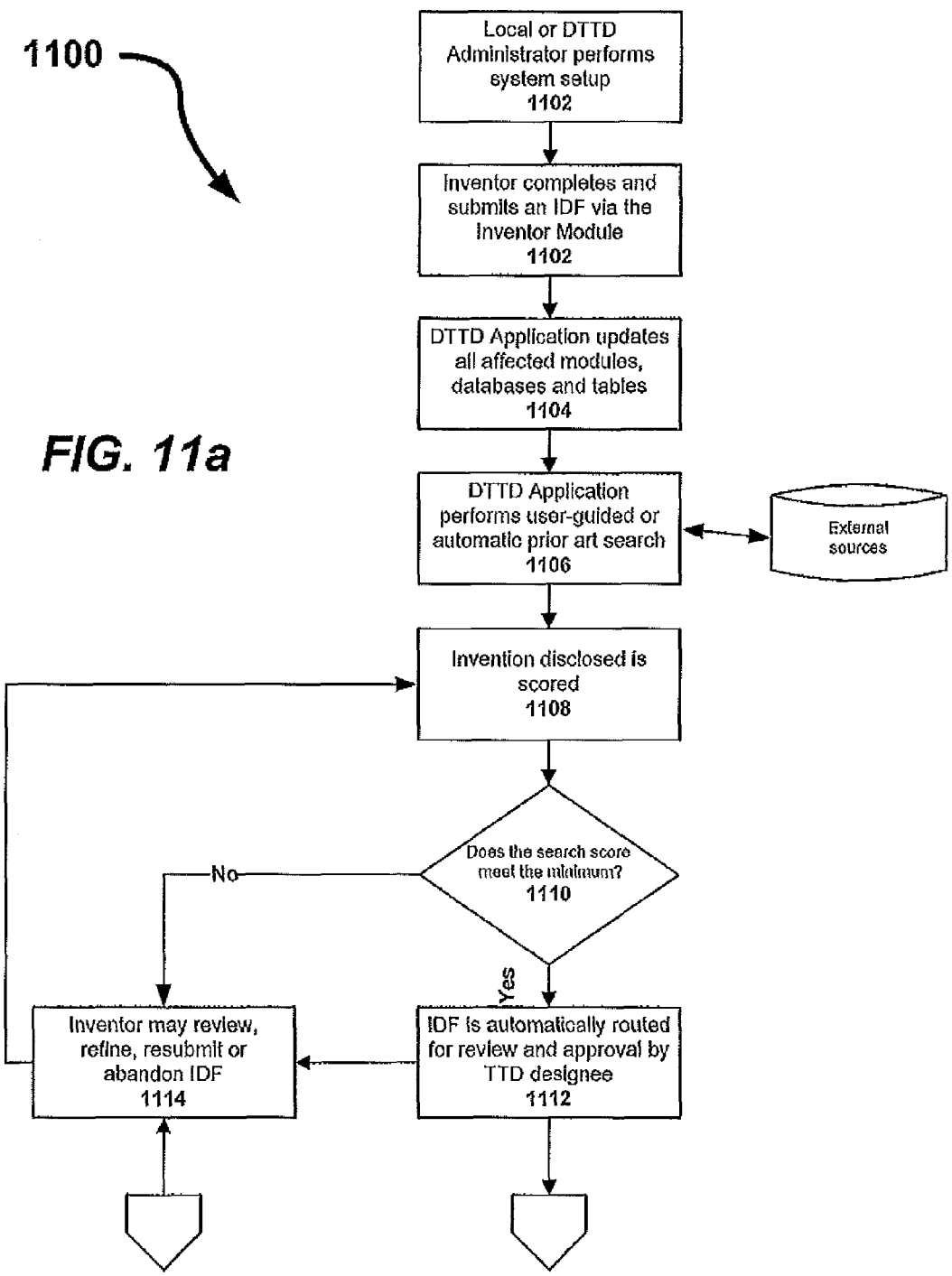
Figure 11B:
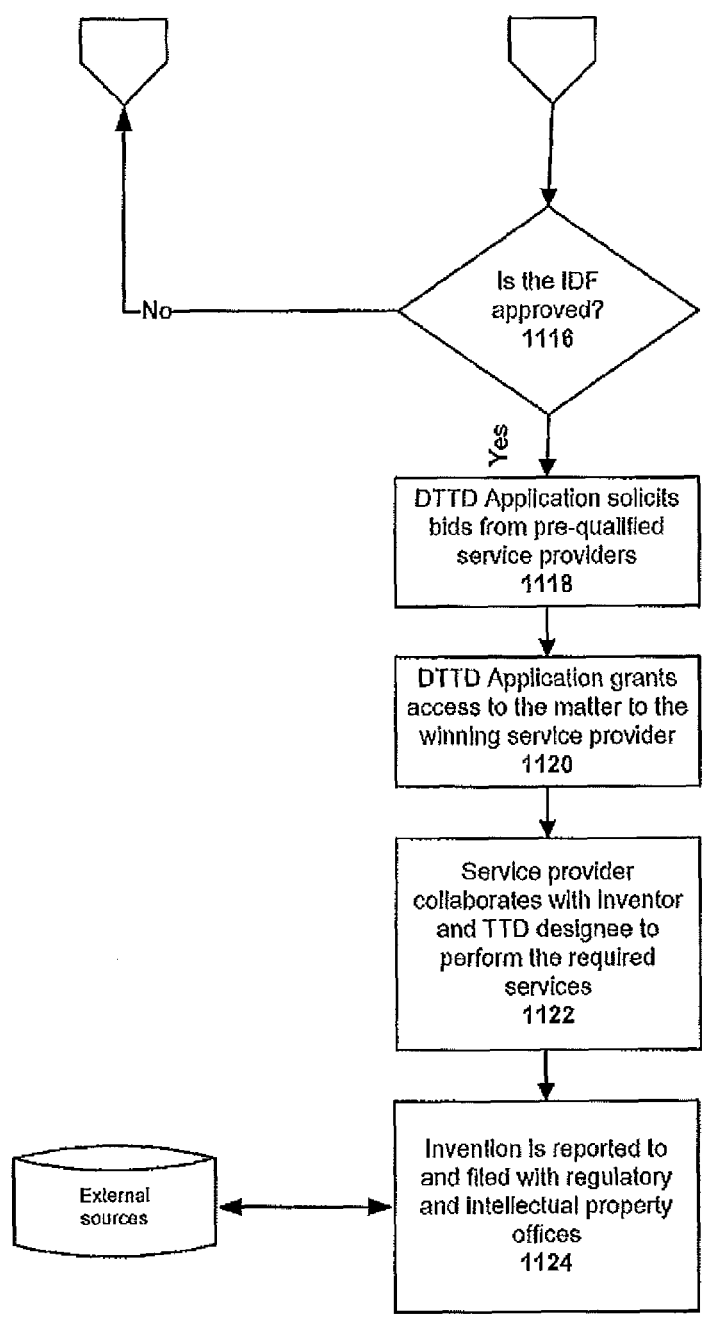

FIGS. 11a and 11b together are a flowchart illustrating an exemplary workflow.

DETAILED DESCRIPTION OF THE INVENTION

As required, detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular components. In other instances, well-known materials or methods have not been described in detail in order to avoid obscuring the present invention. Therefore, specific structural and functional details disclosed herein are not limiting but serve as a basis for the claims and for teaching one skilled in the art to variously employ the present invention.

Figure 1:
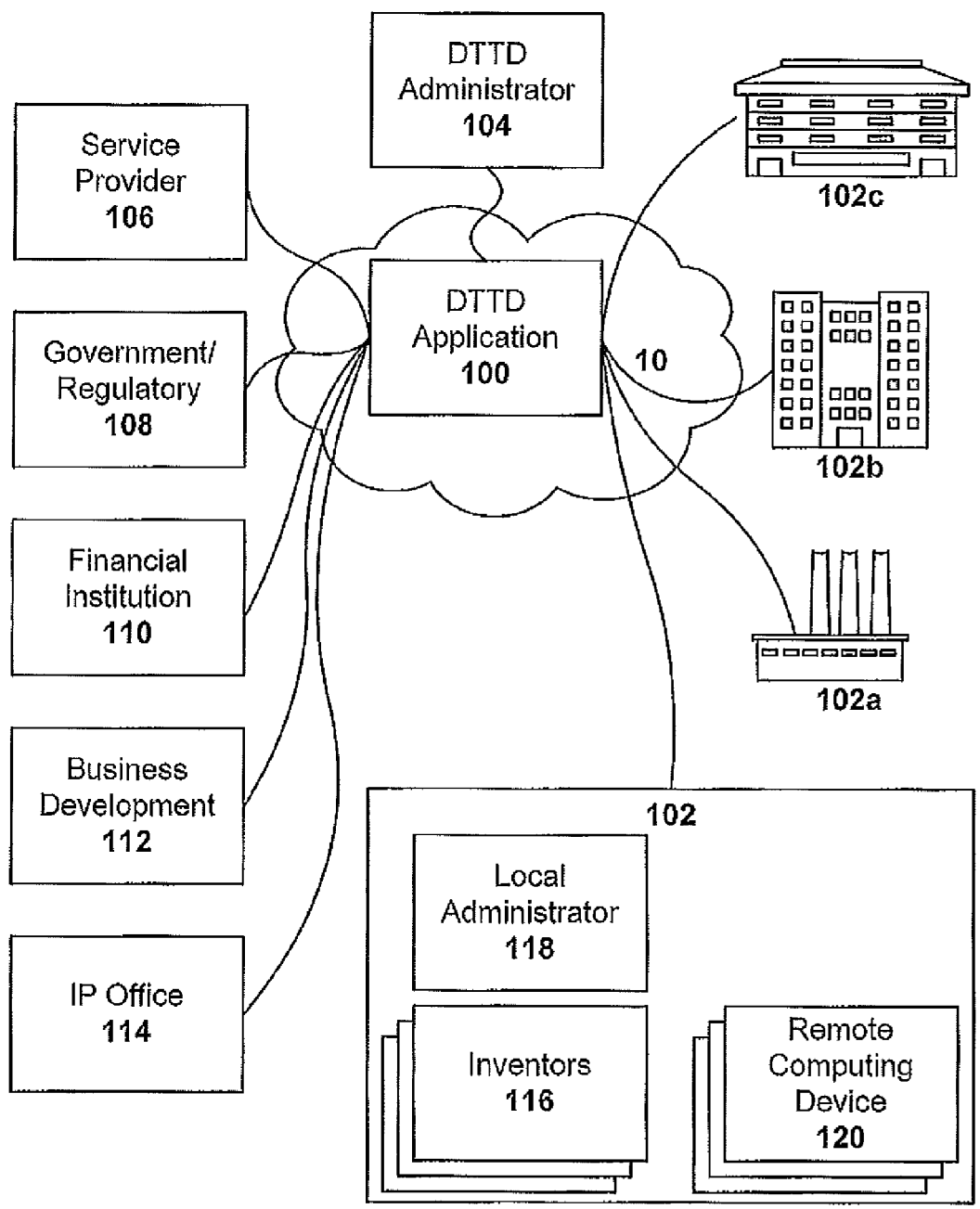
FIG. 1 is a block diagram that provides the context of the invention.

Referring now to FIG. 1, the various embodiments of the present invention will be described in a context in which the DTTD application 100 resides on a node on the Internet 10. Those skilled in the art will readily appreciate that elements or modules of the DTTD application 100 could be distributed, that is, residing on or operating utilizing several nodes on one or more networks, and that several DTTD applications can operate in tandem or independently to provide the functions described herein. In any event, the phrase "DTTD application" should be construed as inclusive of multiple, modules, software applications, and other components.

The DTTD application 100 is accessible via the Internet 10 by any number of inventive entities 102. For purposes of providing examples and not of limitation, a generic inventive entity 102 is shown along with more specialized type of inventive entities 102, including an industrial facility 102a, a research institution 102b such as a hospital, and an educational institution 102c such as a university. The DTTD is also accessible either directly or via the Internet by a DTTD Administrator 104 which may be integral to or distinct from the DTTD application 100, and may be driven by software and/or a human operator.

Service providers 106, such as but not limited to attorneys, search firms, grant writers, accountants, patent agents, promoters, manufacturers, and technology transfer brokers may also access the DTTD application 100. At least outgoing access from the DTTD application 100 is provided for communication and interaction with third party entities such as government and other regulatory organizations 108, financial institutions 110, business development resources 112 (e.g., venture capitalists, investors, potential licensees, and the like), and domestic or foreign intellectual property offices 114.

Each inventive entity 102 typically associates multiple inventors 116 (e.g., scientists, professors, engineers, students, software developers, and the like) as users of the DTTD application 100, and possibly at least one Local Administrator 118 who may or may not be dedicated to TTO activities. The Local Administrator 118 may simply be the individual within the inventive entity 102 that acts as the gatekeeper for information going into or coming out of the DTTD application 100, or the Local Administrator 118 may take a more active role in collaboratively administering the technology transfer program along with the DTTD application 100, as will be described in more detail below. Typically, the inventors 116 and the Local Administrator 118 utilize multiple remote computing devices 120 to access the DTTD application 100.

Figure 2:
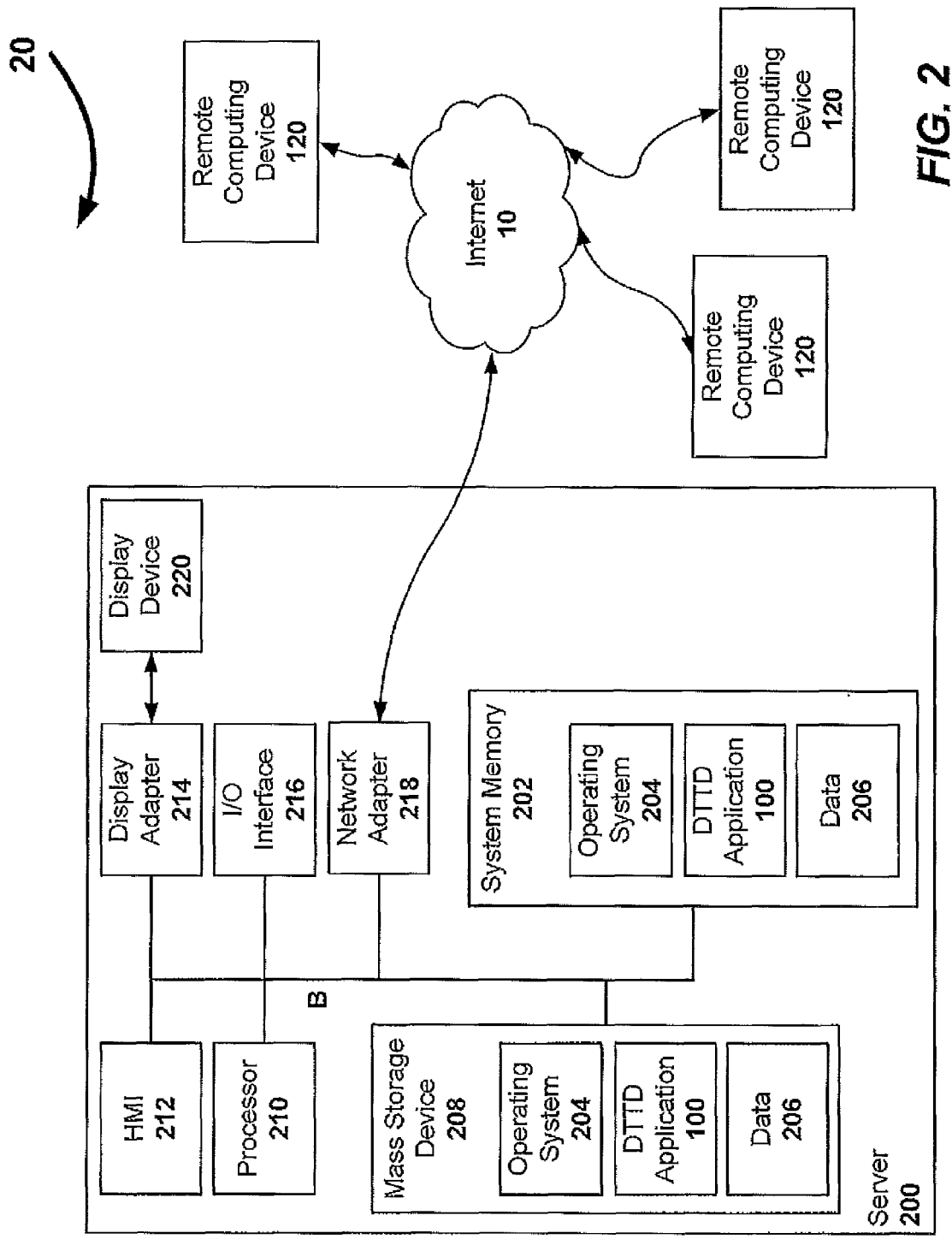
FIG. 2 is a block diagram that illustrates the environment of the exemplary embodiments of the invention.

As mentioned above, and with reference to FIG. 2, the exemplary environment 20 for the DTTD application 100 includes a server 200, although in general, the DTTD can be implemented as a combination of hardware and software. The implementation of FIG. 2 is only an example and is not intended to suggest any limitation as to the scope of use or functionality of the architecture. Neither should this implementation be interpreted as having any dependency or requirement relating to any one or any combination of illustrated components.

The server 200 can operate in conjunction with numerous other general purpose or special purpose computing systems or configurations. Thus, the environment 20 can include any one of several well known computing devices, such as personal computers (PCs), server computers, laptop devices, and multiprocessor systems. Additional examples include set top boxes, programmable consumer electronics (e.g., personal digital assistants), network PCs, minicomputers, mainframe computers, distributed computing environments that include any of the above systems or devices, and the like.

The server 200 houses the system memory 202, on which software applications such as an operating system (OS) 204 and the DTTD application 100 are stored, along with data 206 that is accessible by the software applications. The system memory 202 can include computer readable media in the form of volatile memory, such as random access memory (RAM), and/or non-volatile memory, such as read only memory (ROM).

In addition, the server 200 can include or interface with a variety of other computer readable media. For example, this can include volatile media, non volatile media, removable and non-removable media depending on the type of system component within which the media is used.

For example, an exemplary mass storage device 208 uses nonvolatile media for storing computer code, computer readable instructions, data structures, program modules, and other data for the server 200, and can be used to back up or alternatively to run the OS 204 and/or the DTTD application 100. For instance, the mass storage device 208 can include a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

The server 200 can include numerous additional components, such as but not limited to, a system bus B that couples various system components to the system memory 202 and to the mass storage device 208. Other system components can include one or more processors or processing units 210, a human machine interface 212, a display adapter 214, an input/output (I/O) interface 216, and a network adapter 218.

To interface with a top level user such as the DTTD Administrator 220, the server 200 is connected to or includes a display device 220. In addition, the server 200 can operate in a networked environment using logical connections to one or more remote computing devices 120 via the Internet 10. Each of these remote computing devices 120 is located at a physical location that is away from the server 200, and thus, each remote computing device 120 is also associated with its own display device 220 (not shown). Examples of possible remote computing devices 120 include PCs, servers, routers, peer devices, smart phones, internet enabled televisions, hand held computers, and the like.

The display device 220 can be one of several types of devices for visual or tactile presentation of images (including text) that has been acquired, stored, or transmitted in various formats. For example, the display device 220 can be an analog electronic display such as a CRT (cathode ray tube), a digital electronic display such as an LCD (Liquid Crystal Display), or some other suitable type of display. In addition to the display device 220, the server 200 can connect to other input/output peripheral devices, such as a microphone (not shown), speakers (not shown), a tactile device, a printer (not shown), and the like.

Running on the server 200, the DTTD application 100 generates a graphical user interface (GUI) that is accessible directly at the server and indirectly via the Internet 10 using any of the remote computing devices 120. The GUI consists of a number of web pages that direct the user through any number of options for operations and transactions, including the provision and acquisition of information.

A user can interact with the DTTD application 100 on the server 200 so as to issue commands and provide information via one or more input devices (not shown). The input devices can include, but are not limited to, a keyboard, pointing device (e.g., a "mouse"), a microphone, a joystick, a serial port, a scanner, and the like. These and other input devices can connect to the processor 210 via the human machine interface (HMI) 212, which is coupled to the system bus B. This human machine interface 212 may be connected by additional or alternative interface and bus structures, such as a parallel port, game port, or a universal serial bus (USB).

Logical connections between the server 200 and the remote computing devices 120 can be made via a local area network (LAN) and a general wide area network (WAN). These networks can be wired networks, wireless networks, and the like, such as typical office networks, enterprise-wide networks, intranets, in addition to the Internet 10.

The system bus B represents one or more of several possible types of bus structures, including a memory bus or memory controller, a peripheral bus, an accelerated graphics port, and a processor or local bus using any of a variety of bus architectures. The architectures can include, for example, an Industry Standard Architecture (ISA) bus, a Micro Channel Architecture (MCA) bus, an Enhanced ISA (EISA) bus, a Video Electronics Standards Association (VESA) local bus, and a Peripheral Component interconnects (PCI) bus also known as a Mezzanine bus. The system bus 160 and all buses specified in this description can also be implemented over a wired or wireless network connection. Consequently, the remote devices 120 can include components, such as mentioned above, connected by the system bus B, which in effect implements a distributed computing system.

For purposes of illustration, applications and other executable program components such as the operating system 204 and the DTTD application 100 are illustrated herein as discrete blocks. However, it is recognized that such programs and components reside at various times in different storage components of the server 200, and are executed by the processor(s) 210 of the server 200. An implementation of other application software (not shown) may be stored on or transmitted across some form of computer readable media. Computer readable media can be any available media that can be accessed by a computer. By way of example, and not limitation, computer readable media may comprise "computer storage media" and "communications media." "Computer storage media" can include volatile and non-volatile, removable and non-removable media implemented in any method or technology for storage of information such as computer readable instructions, data structures, program modules, or other data. Computer storage media includes, but is not limited to, random access memory (RAM), read only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and is accessible by the server 200.

Data 206 is stored in an easily retrievable format such as any of one or more relational databases known in the art, or yet to be developed. Examples of such databases include DB2, MICROSOFT ACCESS, MICROSOFT SQL SERVER, ORACLE®, MYSQL, POSTGRESQL, and the like. These databases can be centralized or distributed across multiple systems.

The exemplary embodiments are described in the context of a "thin client" solution. In other words, the remote computing devices 120 maintain a minimum of software needed to access the DTTD application 100, including a browser application such as MOZILLA FIREFOX, MICROSOFT INTERNET EXPLORER, NETSCAPE, SAFARI and the like. Each remote computing device 120 may further maintain authentication software or components, such as encryption keys, identity certificates (e.g., public keys), cookies, and other identifying indicia or credentials.

Figure 3:
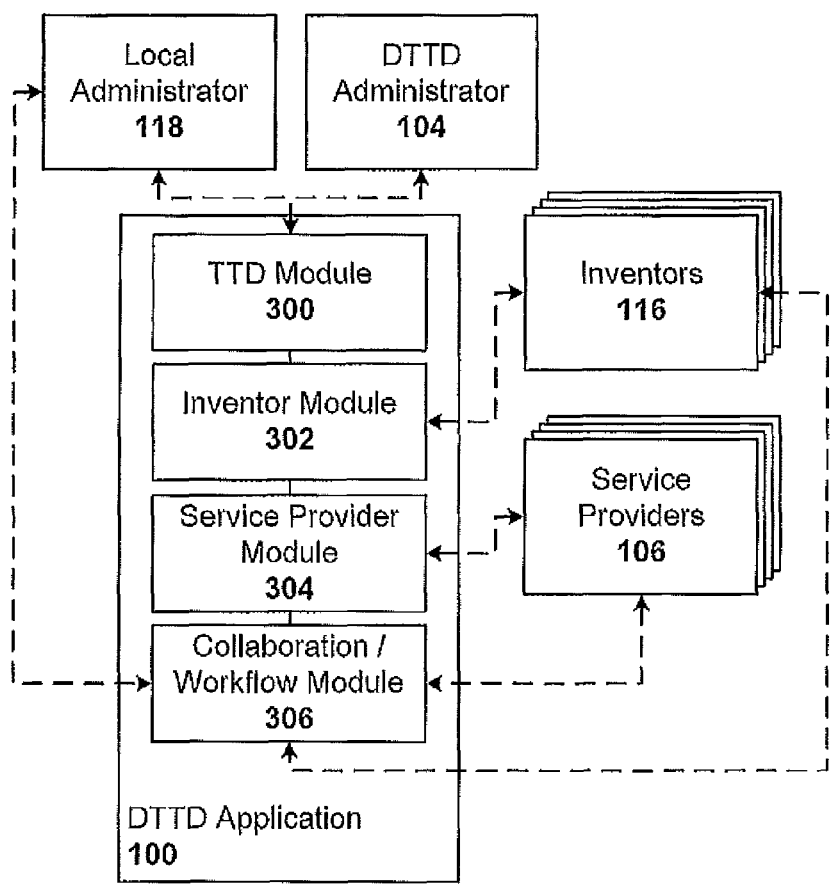
FIG. 3 is a block diagram that illustrates certain of the functional elements of the DTTD application, in accordance with certain exemplary embodiments of the invention.
Figure 7:
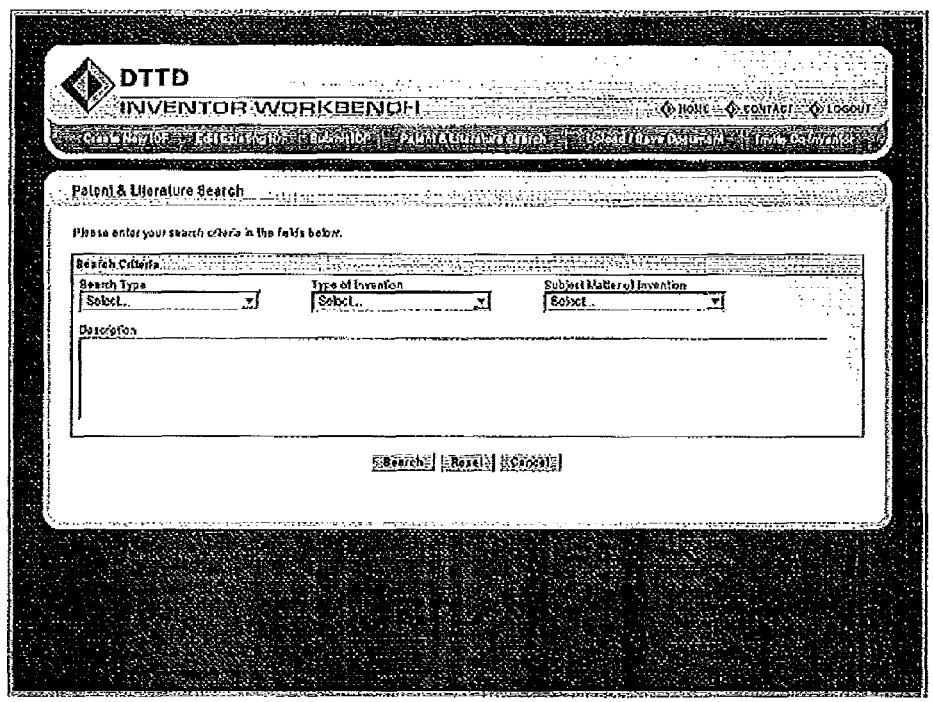
FIG. 7 is an illustration of an interface for defining parameters for an electronic patent and literature search, in accordance with certain exemplary embodiments of the invention.
Figure 9:
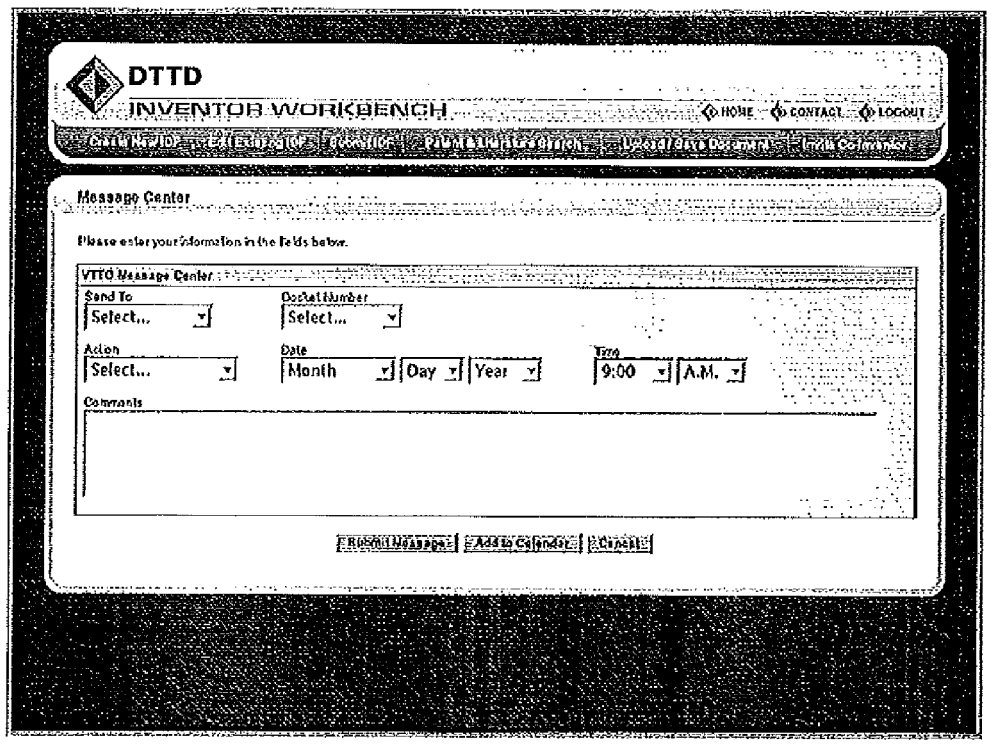
FIG. 9 is an illustration of an interface for drafting, associating and submitting an electronic message via the DTTD application, in accordance with certain exemplary embodiments of the invention.

Referring now to FIG. 3, teaching the functionality of the DTTD application 100 is simplified by considering the DTTD application 100 as including four functional modules, namely: a TTD module 300, an inventor module 302, a service provider module 304, and a collaboration/workflow module 306. It should be noted that as used herein, the term inventor refers to one who authors or otherwise creates innovative material, which may include inventions, trademarks, trade dress designs, writings, art, and the like.

The TTD module 300 is primarily administered and accessed (as the broken lines indicate) by the Local Administrator 118 designated to maintain the inventive entity's presence on the DTTD web site, or the DTTD Administrator 104 may perform that task for several inventive entities 102. The remaining modules 302, 304, 306 interface automatically with the TTD module and with one another as needed. Inventors primarily access the DTTD application 100 via the inventor module 302, service providers primarily access the DTTD application 100 via the service provider module 304, and all of the user types utilize the collaboration/workflow module 306 to provide seamless collaboration and processing of the matters.

The TTO Module

The TTO module provides the web pages and other information that is useful to individuals who function as TTO staff in the capacity of the Local Administrator 118 or at least in the capacity of liaison to the DTTD for each inventive entity 102. All of the data associated with a particular inventive entity 102 is identified, such as by using an entity code, so as to be accessible to gain an enterprise level view of all information, including users, inventors 116, service providers 106, other entities 102, matters, status, transactions, and the like, that are associated with that particular inventive entity 102.

Each inventive entity 102 has an associated profile which defines a custom configuration for the system. Maintaining this profile, as well as performing day-to-day back office and workflow tasks, is the duty of either the internal or the external administrator. More specifically, if the inventive entity 102 has the human resources to at least partially staff a TTO, its Local Administrator 118 may maintain and update its profile. If the Local Administrator 118 is merely a liaison, this function can be outsourced to the DTTD Administrator, perhaps for a higher fee.

The configuration profile can include, but is not limited to the following:

Contact information—addresses and phone numbers of internal resources within the inventive entity 102, including personnel, offices and departments;

Administrator setup—defines the users having the highest internal access level, including the ability to configure the parameters of the configuration profile, to define access levels for internal and external users, to define approval protocols, budgets, and goals, and to define reports;

Account information for third party subscription services—identifies third party subscriptions available to the DTTD application 100 on behalf of the inventive entity 102 together with account information to enable indirect access (e.g., user names, passwords, subscription expiration dates, and the like);

Financial data—defines fixed or variable revenue shares and revenue division algorithms;

Workflow/routing specifications—defines the protocol for the entity-specific review and approval processes, including ranking and scoring criteria;

Entity-specific reporting options;

Visual layout options—including "skins," applicable trademarks, logos, and trade dress to be applied to the DTTD interface, entity specific labels for GUI elements (e.g., buttons, field names, and the like), terminology, system colors, and the like; and Security setup—defines roles, access groups and specifies which system functions are accessible to each. Modules can be toggled on or off, as desired to manually limit access (e.g., to unilaterally block submission of bids or invention disclosures from any or all users for a given month), and conditional settings can be defined to automatically control access (e.g., to block submission of bids or invention disclosures by a particular user or group of users based on the occurrence of a predefined event).

Accordingly, the day-to-day workflow and back office functions associated with a TTO are managed via the TTO module, including:

User management—adding users, assigning roles, defining access groups, changing user information and searching users;

Matter management—assigning docket numbers to matters and projects, setting timelines and benchmarks, and prescribing strategy;

Management of specialized forms and library data—defining and uploading forms, documents, resource materials and the like, that are to be made available only to users authorized by the particular inventive entity 102. For instance, editable forms are revised, uploaded, and stored in template format to be downloaded and completed via the GUI provided by the DTTD application 100;

Sending and receiving electronic notifications from various users, particularly from inventors 116, potential business development partners 112 and service providers 106;

Sending and receiving electronic bidding information to service providers 106, including letting a project out for bid;

Maintaining and updating subscription information for all third party service providers 106, including tracking conflict of interest information to eliminate certain service providers from certain opportunities;

Sending and receiving electronic contracts and invoices;

Authorizing payment to service providers 106 for services rendered;

Managing intellectual property prosecution;

Managing correspondence to and from intellectual property offices 114;

Scanning correspondence to and from intellectual property offices 114 into an electronic technology transfer file;

Ensuring that all service providers 106 and inventors 116 comply with the TTO and VTT policies;

Applying for and maintaining all accounts, numbers and codes required to communicate with intellectual property offices 114 electronically; and Maintaining accurate and current relevant information associated with the inventive entity 102, such as: policies, forms, documents, identification numbers, access codes, passwords, and the like.

Additional data or functional elements can be added, such as by defining custom fields or processes, with the same basic premise of associating the information with the entity identifier. It is desired that no function in the system be limited in such a way as to prevent configuration at the entity level.

In certain embodiments of the invention, there can be exceptions to the security protocol that limits information only to individuals or access groups that are associated with the same inventive entity 102 as the information. For example, to facilitate collaboration between inventive entities 102, the security algorithm can provide an exception for inventors 116 that have been identified as participants in a joint venture or other collaboration. In many research collaborations, the inventors 116 are located at different Universities or research facilities.

For example, although two co-inventors can be associated with different inventive entities 102, the system can enable them to be associated with one another. Depending upon the desired security setting, this cross-association can be established by the Local Administrator 118 or by the inventor 116, who "invites" the foreign inventor to access to designated parts of the inviting inventor's workbench (as described below). The inviting inventor, and indeed the Local Administrator 118 cannot exceed his or her level of authority to invite foreign users to access the DTTD application 100. To facilitate cross-association of users, it is advantageous for user names to be unique over the entire DTTD system—either individually, or by concatenating an entity-specific user name with the entity identifier. Invitations can be issued to specific usernames, or the DTTD application 100 can include a search facility to locate inventors across the entire system.

Various web pages with GUIs or other interfaces 400 can be provided to implement each module, some web pages including multiple interfaces in a "dashboard" or "workbench" arrangement in which multiple types of information can be accessed at a glance. For purposes of illustration, and not of limitation, the TTO module 300 of the DTTD application 100 may include each of the following interfaces either independently or in combination:

1. Inventive entity contact information management—to add addresses, phone numbers, contact persons to the Entity definition.

2. Subscription management—to create, edit, or delete records detailing subscriptions for data sources that available to the inventive entity 102; including defining how and where the data source is used within the system (e.g., location of links, on which web paged displayed, etc.).

3. Financial account access information management—for electronic payment of invoices, defining revenue split and share algorithms. This data is preferably encrypted at the data level.

4. Workflow routing rules management—to create, edit, or delete records detailing rules and protocols for workflows to then enable individual users internal to the inventive entity 102 to define them. Each record can include selection criteria (e.g., data fields and test values), a destination (e.g., users or user groups), outcome (pre-defined values), and optionally defines the next step. The system presents this information as a wizard that walks to the administrator through the process and builds the entire workflow step-by-step. At the end, a visual representation of the workflow is viewable. A delete rule can be implemented to determine what happens when a workflow rule definition session is in mid-execution when it is deleted or not finalized.

5. Invention record scoring rules management—each invention record submitted via the DTTD application 100 may eventually scored to determine its potential value to the inventive entity. This interface enables the user to create, edit, or delete records, preferably via a wizard, that establishing rules for scoring invention records. These rules may analyze the values of parameters submitted with the invention disclosure form (IDF) to determine the invention's potential, in combination with the number of similar innovations identified in a prior art search, which may also be performed via the DTTD application. Alternatively, the inventor record or assessed by requesting an independent market assessment or technology evaluation. This assessment should be done as early as possible to prevent expending resources unnecessarily.

6. Visual layout management—this utility allows the user to perform functions to select colors, upload logos, customize lists of field names and define data labels, develop Help Screen text, and the like.

7. Security group management—enables users to define security groups using roles that can be pre-defined by the DTTD Administrator 104 or by the Local Administrator 118.

Figure 4:
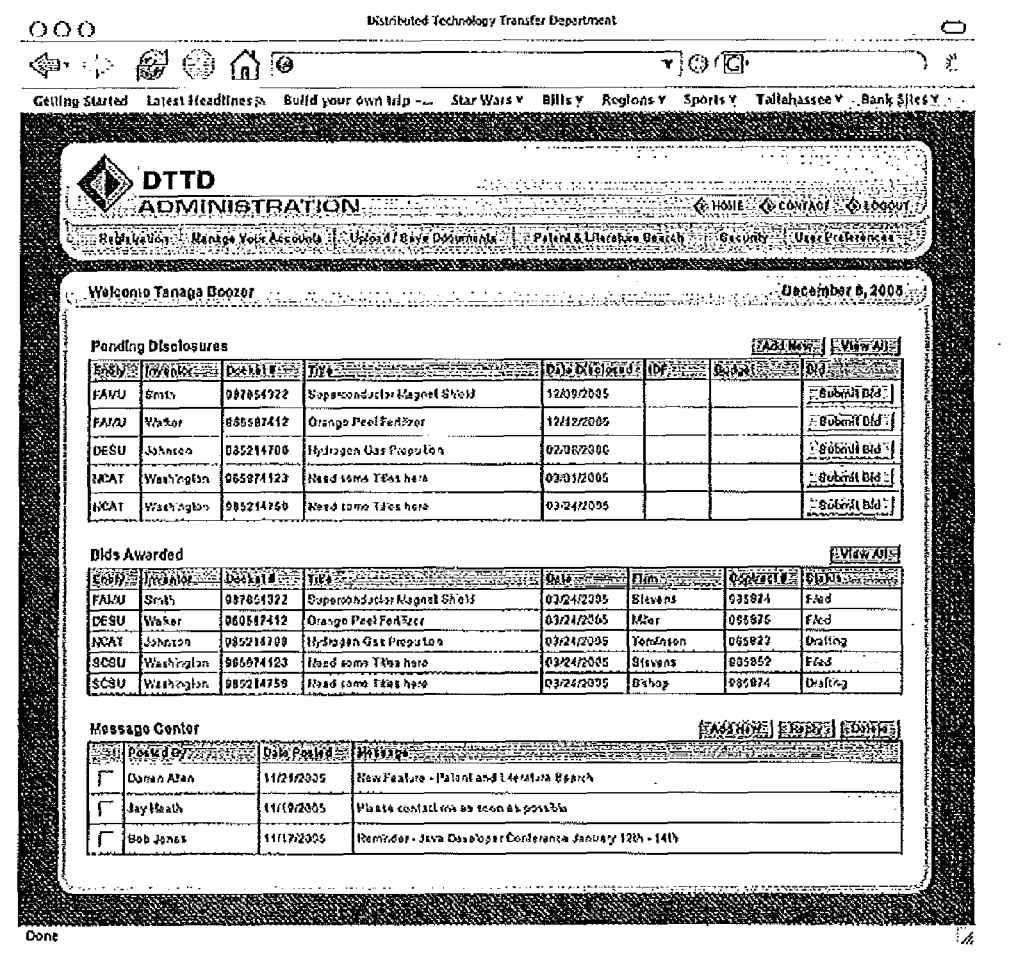

Referring now to FIG. 4, an exemplary web page styled TTO interface 400 is shown that demonstrates one of many different ways of presenting and capturing the information that is managed by the TTO module 300. In general, each interface includes one or more panes to distinguish different types of information. The TTO interface 400, for example, includes a header pane 402, which includes a header 404 that may provide such static information as the inventive entity 102 with which the user is associated or the module in which the user is working, as well as several escape buttons 403 that reorient the user, such as to a home page, the previous or next page, a contact page, or a log off utility (none of which are shown). The header pane 402 also includes a menu bar 406 that allows the user to navigate to various other interfaces managed by the TTO module 300. A second pane 408 includes an instance information bar 410 and various subforms 416, 434, 444 that draw data that is logically related to the workflow performed by the user. The instance information bar 410 provides confirmatory information to apprise the user of the status of the session, the information including identification of the current user by displaying the user's username 412 as well as a date field 414 that informs the user that the information displayed on the interface is current.

The exemplary TTO interface 400 includes a pending disclosure subform 416 which details the status of disclosures pending in the DTTD application 100. Each subform presents a number of fields, some of which may contain data, and some of which are editable subject of course to the user's access level. The exemplary pending disclosure subform 416 includes multiple records, each record including an entity identifier 418, the username 412 associated with the pending disclosure, the docket number 420 assigned to the disclosure, the title 422 or other descriptor of the disclosure, the date disclosed 424, the status of the invention disclosure form 426

(e.g., submitted, executed, absent, etc.), the budget 428 allotted to the disclosure, and the bid status 430. Any of these fields may be interactive, allowing input or manipulation, or inviting action by pressing a button, for example to view or submit a bid directed to this disclosure. In addition, the visible contents of the subform 416 or the underlying data tables can be changed or filtered by utilizing subform control buttons 432.

A second subform 434 presents records pertaining to bids that have been awarded. The bids subform 434 includes some of the same parameters discussed above with respect to the pending disclosures subform 416, but the records included are limited to those that are associated with a bid that has been awarded. In other words, and disclosure that is pending may appear in the pending disclosures subform 416, but may not appear in the bids subform 434 unless a bid has been accepted and a contract awarded to a service provider to 106 to accomplish a task associated with the pending disclosure. The bids subform 434 also include additional parameters that are associated with the acceptance of a bid, including the date awarded 436, the service provider identifier 438, the contract number 440, and the performance status 442 (e.g., filed, drafted, completed pending approval, etc.). Subform control buttons are also provided to change or filter the contents of the bids awarded subform 434.

The TTO interface 400 also includes a third subform 444 that serves as a message center. The message center subform 444 presents records detailing emails, text messages, instant messages, or other electronic messages directed to the user and/or associated with the pending disclosures or the bids awarded shown in the other two subforms 416, 434. Parameters associated with the exemplary message center subform 444 include a selector control 446, the sender identifier 448, the date posted 450, and the message subject descriptor 452.

The web page and GUI interfaces identified above impart certain TTO management functionality, including the ability to:

1. Create, edit, activate, and inactivate users. Active users have access to the system, while inactive users do not. Once a unique user profile is created, it is possible for the user profile to exist perpetually in the DTTD in an inactive state with the ability to be activated for any of the various inventive entities 102 over time. It is can also be determined what, if any, access a user may have to previous work if he or she moves to a different entity and is reactivated. This functionality may add increase the attractiveness of the system to inventors 116 and encourage them to more fully utilize the workbench prior to final submission of an invention disclosure form (IDF).

2. Generate pre-defined reports, create or edit and save new reports. Access to individual reports or groups is controlled at the role or access group level. Reports can be saved so that they are accessible from specific workbenches or only via the reporting interface.

3. Create, edit, and delete review committees. Define a committee and assign its members, including one primary designee who receives all notifications and communication about committee activities.

4. Assign docket numbers.

5. Manage and edit forms.

6. Manage notifications. Create a notification as a draft, send notification, review all notifications in the system, reassign a notification to another user, forward notifications, and cancel notification.

7. Manage electronic bids. Bids are posted automatically based on workflow, but this interface allows administrators to override and post a bid manually, or retract an automatic posting.

8. Manage contracts and invoices. Enables exchange of contracts and invoices from service providers. Invoices can be approved or rejected and on approval, and electronic payments to the service provider can be initiated.

9. Scan, upload and index electronic documents to the document store.

10. Manage transmittal codes and other parameters needed to communicate with the intellectual property offices.

11. Add, edit and delete other codes used by the system (e.g., outcome codes for workflow).

12. Set up notifications to federal agencies 108, including maintenance of name, contact information, routing information, and the like.

The Inventor Module

The inventor module 302 provides an interface and toolset to the inventor 116 (the inventor workbench) with the ultimate goal of enabling the inventor 116 to manage, research, and submit an invention disclosure form (IDF).

Figure 5:
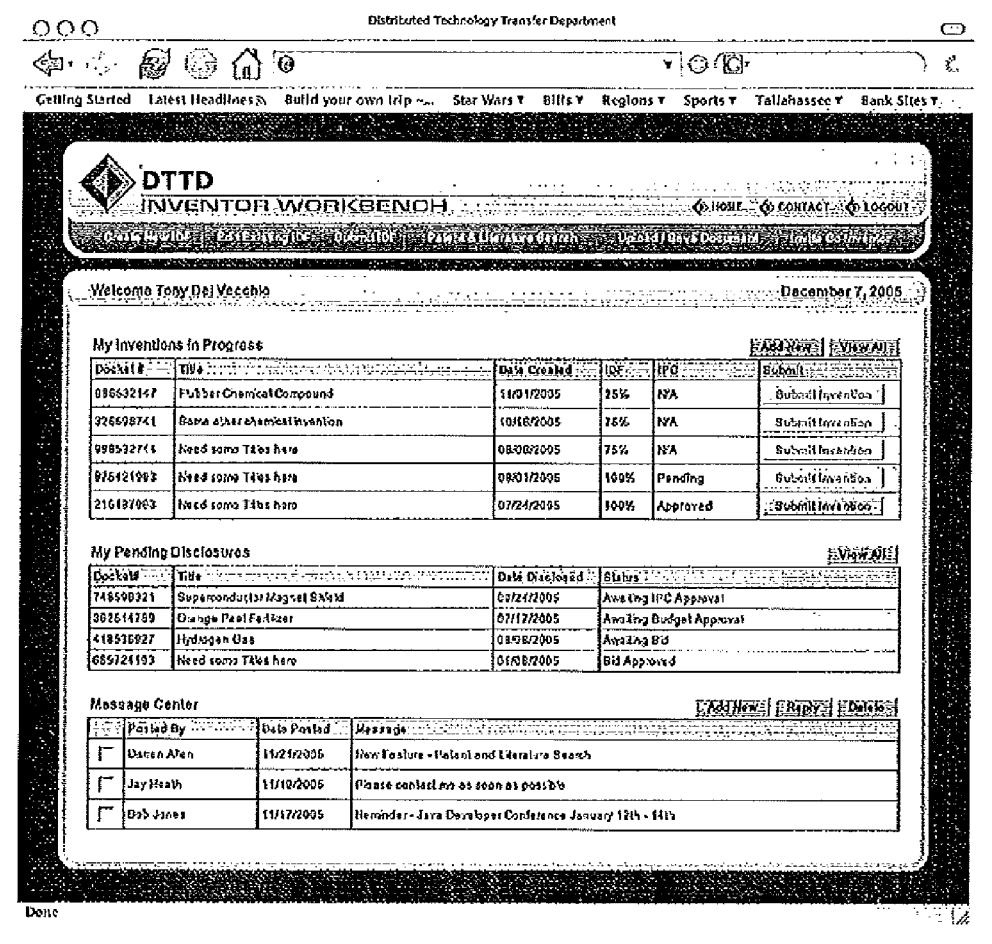

The inventor module 302 centers around the workbench interface 500 (FIG. 5), which is the home page of the inventor 116 when accessing the DTTD application 100. The workbench interface 500 is the primary access point, housing links to all other modules 300, 304, 306 and providing a collaborative environment for working with other inventors 116.

Figure 6:
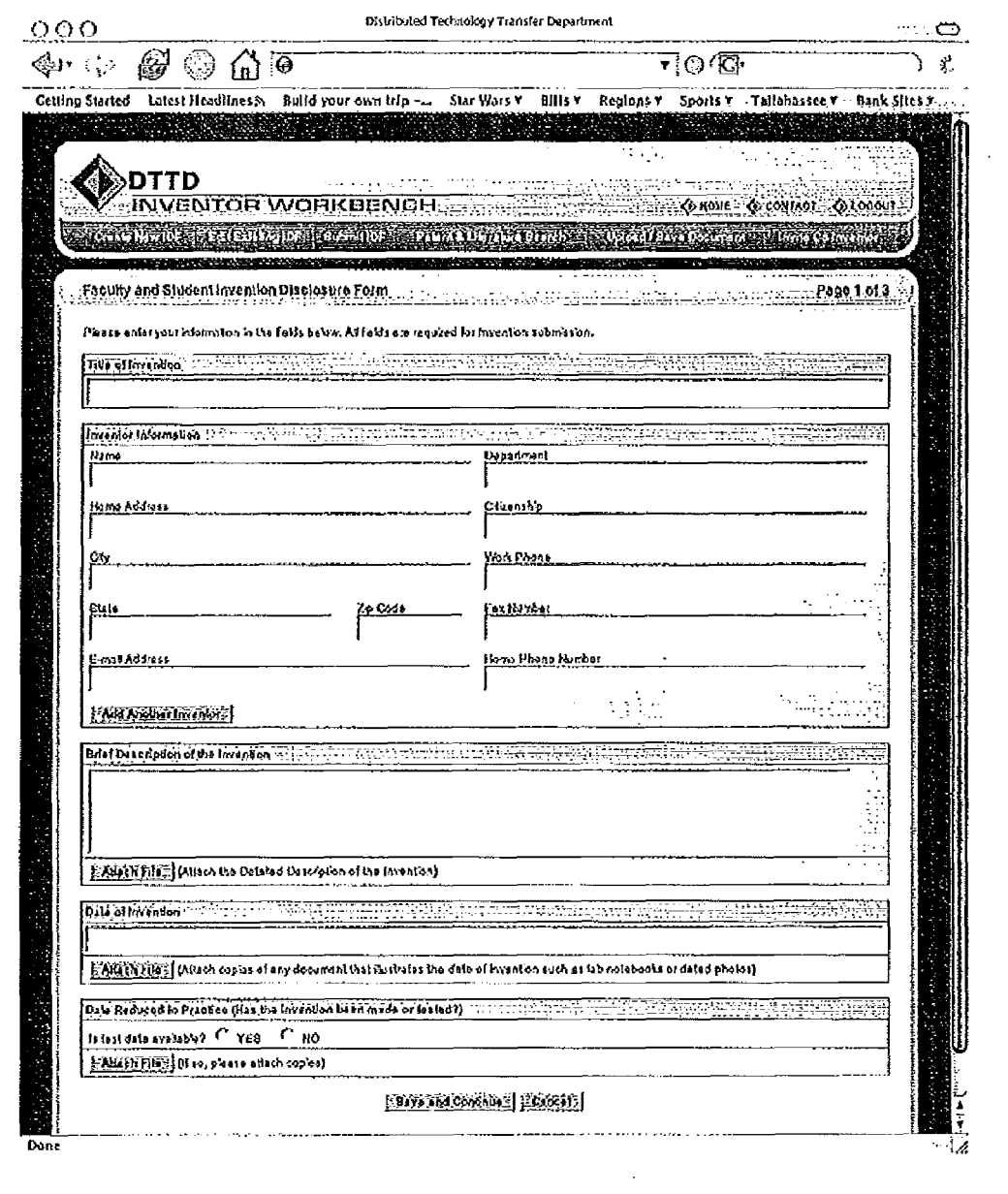

When a user associated with the inventor role signs onto the DTTD, a menu of options is available on the menu bar 502 of the workbench interface 500. One of the options can be to work with Invention Disclosure Forms, which are the first step of the Technology Transfer Department process. The user can choose to complete a new disclosure, revise an existing Invention Disclosure Form, attach a document or submit an Invention Disclosure Form. The user can select from the menu bar 502 how the electronic IDF (e-IDF) information is displayed. Some users may prefer the system to prompt them by posing several questions while others may want the system to display the form and allow them to complete the "fillable" e-IDF (FIG. 6).

Another function available on the menu bar 502 from the workbench interface 500 is the Patent and Literature search. This search can be initiated any time by the user and may occur automatically upon completion of an e-IDF. Searches are conducted against existing data stores available externally taking into account the third party subscriptions available to the inventive entity 102—for example, searchable patent and non-patent literature databases and search engines and the like. Search parameters can be determined according to the values of one or more of the e-IDF fields, including Title, Abstract, Brief Description, Type of the Invention, Date of the Invention, Date Reduced to Practice, Purpose of the Invention, Relevant Patent and Literature References. The number and quality of hits returned on the search is translated into a score associated with the IDF—the more hits, the lower the score. If a significant number of relevant hits are returned and the IDF is not yet finalized, the Inventor is given the option of reopening the disclosure to narrow or redefine the invention. If the IDF has been finalized already, the score is attached to the IDF and sent to the Technology Transfer Office Designee.

The inventor module 302 allows the user to add, update, and manage his or her invention portfolio. This includes the option to submit "what if" searches to the archive for like ideas or inventions and receive results that carry a score relative to the submitted idea or invention. The module allows the user/inventor to separate his/her "ideas in progress" versus items already submitted and in the commercialization and protection workflow.

For purposes of illustration, and not of limitation, the inventor module 302 of the DTTD application 100 may include each of the following interfaces either independently or in combination:

1, Workbench interface 500.
2. e-IDF completion and submission interface 600.
3. Patent and Literature search interface 700 and results interface 800—search parameters may be gleaned from an IDF or the values can be entered on-screen.
4. Invitation interface—used to invite a co-inventor to access user's workbench using co-inventor's user name.
5. Document management interface—used to upload documents, including prior art references to a document store.
6. Message generation interface 900.

The Service Provider Module

The service provider module 304 will now be described in the context of preparation and prosecution of patent applications, although as demonstrated above, patent attorneys are only one of the various of types vendors that may access the DTTD. In certain embodiments, each service provider 106 utilizing the DTTD application 100 pays for access, that is, a charge is levied to allow the service provider 106 to be listed as a potential recipient of a contract award. The contracts may then be awarded proactively by the inventive entities 102, or this module may function as an electronic bid system. For instance, attorneys can register in the DTTD application 100, advertise different levels of service and submit bids to the inventive entities 102 via the DTTD unless the service is provided exclusively by a service provider.

An illustrative example follows: An attorney wants to receive notifications of projects involving only chemical or pharmaceutical inventions, or only those from a particular University. The attorney registers via the DTTD application 100 and pays a subscription fee. Different levels of subscription are available at the firm and attorney level. A Premium Service Plan entitles attorneys to receive publications of all available work, while a Custom Service Plan allows attorneys to bid on selected work and for pre-selected clients. The Attorney reviews the published work requests and submits a bid, which is then evaluated on a number of criteria and work is awarded. The system processes the initial evaluation against the experience of the firm and/or attorney, the subject matter of the invention, the availability of the attorney/firm, the filing needs of the client, the price of the bid, the reputation of the firm/attorney with the DTTD, the electronic resources available to the firm/attorney, conflict issues and the like and assigns a rank order to the bid. The Local Administrator 108 reviews the rankings and makes a final determination before assigning the work to the attorney. Once the assignment is complete, the attorney receives an electronic selection notification and the full project file is made available to the attorney via his/her briefcase interface 1000.

The sophisticated matching and ranking engine requires that a variety of attributes are captured, not only about the IDF, but about the firm and attorney as well. The patent process is lengthy and easily segmented into logical work units, so the system can make it simple for attorneys or firms to address all or only part of the work. The system can also make it simple to substitute counsel if needed, automatically updating all forms and documentation. Communication is key to this process, so a robust messaging and notification system can be incorporated into this workflow. Notifications can be sent and actions logged at numerous points in the process, tickler dates set and referrals with return actions defined.

After the IDF has been completed, the search performed and all the relevant documents have been attached, the user may want to leave a message for the attorney or co-inventor. At anytime, after the attorney has been selected, the attorney may begin sending or receiving electronic message from the inventors 116. Inherent in this feature is the ability to schedule meetings and leave messages. All messages are sent by email using the system and where appropriate, the email will contain encryption keys or codes to ensure confidentiality and security of the disclosed information. This allows all correspondence to be stored in one location for a complete archive.

Attorneys can make any document available to the inventor(s) 116 at any point in the process by "inviting" the inventor(s) to view elements of their briefcase interface 1000 and giving them access to any documents or sections so wished. The patent attorney can electronically notify the inventors 116 that a document is ready for review and editing. Each inventor 116 has access to the document and can individually or simultaneously review and edit the document. The deadline for reviewing and editing the document is included in the notification to the inventors 116 and is automatically added to the inventor's calendar on acknowledgement of the notification. Electronic signatures are important with particularly where the inventive entry utilizes an invention review committee to assess IDFs. At any time, or at defined milestones in the workflow, an inventor's access to documents can be granted or revoked as appropriate. After the attorney reviews the changes to the documents made by the inventors 116, the attorney can prepare the forms required by applicable intellectual property offices 114 using the DTTD application 100 and make the relevant forms available to the inventors 116 for signing and reviewing. The copies of the completed forms are included in the applicable record maintained in the DTTD application 100. Most forms use original signatures, although it is envisioned that electronic signatures can be used and are within the scope of this invention. At any time while disclosing, drafting or prosecuting of the patent application, either the patent attorney or inventor 116 can send electronic notifications to schedule an on-line meeting.

Each time a patent attorney invoices the inventive entity 102, the docket number 420, description of the services rendered and the amount of the invoice are stored. The system can prompt the attorney for the relevant patent number or application number, the type of fee, the amount of the fee. It may be desired that only the Local Administrator 108 or other TTO designee be authorized to approve and electronically authorize payment of the fees. Once the amount invoice equals the amount of the contract, the DTTD application 100 can send an electronic notification that the invoice cannot be accepted because the amount of the contract has been exceeded. The system can immediately return an error message to the attorney or firm that the invoice cannot be processed or authorized. Before the attorney sends the correspondence to the patent office, the system routinely checks and updates, if necessary, the USPTO's current fees. In order to monitor and control cost, billing may be restricted fix rate contracts.

The entire process and particularly the bidding process can also be adapted for other forms of intellectual property protection such as trademark and copyright, as well as other types of services and service providers 106.

For purposes of illustration, and not of limitation, the DTTD application 100 may include each of the following interfaces either independently or in combination:

1. Vendor registration, including fee payment.
2. Vendor profile management.
3. Search and review available requests for bids.

4. Submit or rescind a bid response.
5. View status of submitted bids.
6. Service provider briefcase showing all active work, with links to electronic files, and ability to manage messages and notifications.
7. Form/document completion, submission, editing.
8. Messaging utility.

Workflow and Collaboration Module

The workflow and collaboration module 306 manages all of the collaborative features of the DTTD application 100. In its simplest incarnation, the functionality of the workflow and collaboration module focuses on the IDF workflow and basic electronic messaging.

The typical workflow involves an inventor 116 submitting an IDE, a review committee determining whether or not to approve or reject the submission, service provider selection via the bid system, initiation of the process of securing intellectual property protection, and payment and workflow completion.

Routing protocols are defined by rules the inventive entity 102 establishes using the TTO module 300. Submissions may be routed through the appropriate workflow according to the identity of the inventor 116, the subject matter or type of innovation, the ranking of the innovation, or any combination of other factors known or yet to be defined. Each TTO establishes its own guidelines for the ranking or scoring of the search results. Some offices may want to be notified if the review committee renders a score that is 75 or above, while others may only want notification if the score is 90 and above—the system is fully configurable through the interface. Once an IDF is submitted to the correct review committee members, it is approved or denied. If approved, the IDF is then sent to the attorney bid system. If denied, the Inventor is notified that the IDF will not be forwarded to the commercialization and protection process.

IDFs that meet the routing criteria are automatically sent to the appropriate TTO designee, but IDFs that do not meet the routing criteria are still stored and in the distributed files for viewing at a later time. The Local Administrator 118 or other TTO designee may automatically receive notification of the high scoring disclosures, but all of the disclosures may immediately be made available for viewing and bidding. Each inventive entity determines how much information to include in the body of the notification. The notification of submission of an IDF is sent via email to the Local Administrator 118 or other TTO designee with a link to the full details of the disclosure inside the DTTD.

Once an invention is completely described, disclosed and approved for patent protection, an electronic Request for Service is generated by the DTTD application 100 and sent from Local Administrator 118 or other TTO designee to the attorneys. The request includes the type of application that needs to be filed (provisional or non-provisional, design or plant), the abstract, the description of the invention, the summary of the search results, the date the bidding will close and any additional information the attorneys need to submit a bid.

An aspect of both workflow and collaboration is the generation and utilization of predefined and automatically generated documents, including forms and letters, which can be managed by interfaces in one module, but are used by or available through the other modules. At various points in the workflow, the DTTD application 100 automatically generates appropriate forms and letters to the inventors regarding the time, receipt and status of the IDF and other documents. Access to any given project or IDF is managed by a docket number and password assigned to the IDF at the time of submission. Other forms completed and managed via the DTTD application 100 may include standard intellectual property office forms, such as but not limited to Assignment Form, Information Disclosure Form, Transmittal Form, Utility Patent Application Cover Sheet, Provisional Patent Application Cover Sheet, Oath/Declaration Form, Confidential Disclosure Agreement and Power of Attorney Form.

The DTTD application 100 can be used to generate custom forms, but more importantly, it can be used to generate documents specific to an inventor 116, meaning that if a single project has multiple inventors 116 from different inventive entities 102, each of which has its own format, the same document can be displayed appropriately for each inventor 116 based on the specifications of his/her inventive entity 102. Also at any time, the DTTD application 100 can generate a file with a copy of every document sent and received from the DTTD file.

Referring now to FIGS. 11a and 11b, which together form a flowchart illustrating an exemplary workflow method 1100 implemented via the DTTD application 100. The exemplary method 1100 begins at step 1102, when the Local Administrator 118 sets the DTTD system up by accessing the DTTD application 100 or an associated utility that may be separate from the DTTD application 100. The system set up process may include populating the databases, setting permissions, establishing rules and protocols, uploading forms, customizing the appearance of the interfaces, designing custom workflows and reports, as examples of several of the many functions that may be involved. Once the system is set up, users such as an inventor 116 can access the DTTD application 116, and is preferably immediately presented with the inventor workbench interface 500 after logging in. In step 1102, the inventor 116 navigates using the menu bar 502 to a CREATE NEW IDF control, which presents the e-IDF interface 600 for the inventor 116 to complete. Referring again to FIG. 6, the inventor fills in the fields of the e-IDF, including developing a title of the invention 610, submitting personal information 612 about him or herself (e.g., name, address, citizenship, title, department), providing a description 614 of the invention, identifying other inventors, identifying associated grants and research collaboratives, indicating the date information 616 detailing when the invention was conceived, reduced to practice, disclosed publicly, or offered for sale, and providing test information 618 detailing testing that has been performed. It will be recognized that the foregoing list of parameters is illustrative, as are the fields shown on the interfaces described herein. After completing the e-IDF, the inventor 116 uses the e-IDF menu bar 606 or any of various controls and icons located on the e-IDF interface 600 to upload and save the e-IDF document, or to perform other functions, such as creating another IDF, editing an existing IDF, initiating a search directed to an IDF, or inviting a co-inventor.

At step 1104, the DTTD application 100 creates an invention disclosure record, and transfers data collected on the e-IDF to various tables and records in the applicable relational database. Certain parameters are automatically determined based upon the inventor's input such as the status of the invention disclosure, its classification, and the urgency of the matter. At step 1106, the DTTD application 100, with or without prompting from a user, performs a prior art search to identify any relevant references, such as preexisting patents and publications. The prior art search may also include references identified by the inventor in completing the e-IDF. The prior art search access public or subscription based external data sources, such as patent office records, the Internet, and the like, to locate the references. At step 1108, the results of this search are factored into a scoring algorithm, which generates a score according to a predefined scale. At step

1110, it is determined whether the score meets or exceeds the minimum allowable score predefined by the administrator 104, 118. The minimum score may vary according to subject matter and intellectual property strategy (e.g., an inventive entity may be more interested in speculating on patentability when the technology is critical or particularly lucrative). If the score is sufficiently high, then at step 1112, the IDF is automatically routed for review and approval by the designated individuals (e.g., TTO manager, invention review board, and the like), which access the DTTD application 100 to provide their vote or recommendation. If the score is too low, at step 1114 the inventor is given at least one opportunity to refine the disclosure, resubmit it with additional or different information, or indicate that he or she concurs with the finding that the invention should not be pursued.

Continuing on to FIG. 11a, at step 1116 the DTTD application 100 determines whether the IDF has been approved. If it has not, then the method returns to step 1114. If it has then the DTTD application 100 solicits bid from pre-qualified service providers 1118 and uses the approval and IDF information to specify parameters, such as the urgency, the timeline, the budget, the deliverables, and the like. Once a bidder has been awarded the work, at step 1120, the DTTD application 100 grants the winning bidder access to all relevant information associated with the matter, that is, all of the information that is available and needed for the service provider 106 to complete the work. In step 1122, the service provider 106 may then use the collaboration/workflow module 306 or may directly contact inventor 116 and TTO staff to collect additional information or submit draft patent applications. At some point in the process, this point being designated as step 1124, the invention is reported to applicable regulatory and governmental agencies, and the application is filed with the appropriate intellectual property offices.

Reporting and Compliance

It may be desirable that, once certain information is entered into the system, it is not editable and can be protected to ensure compliance with various regulations. Via the DTTD application 100, establishing rules that control retention of such information becomes a matter of configuration rather than a day-to-day management challenge.

For example, currently, all federal agencies require Universities to report the disclosure of their inventions within sixty days after the disclosure to the university by the inventor. With everything else going on, this deadline can be easy to miss—but the DTTD application 100 automatically generates an electronic report to the agency as part of a predefined workflow, in accordance with the requirements of the particular agency or grant, completely eliminating the manual effort involved once the workflow is defined. If the inventor 116 indicates on the IDE that the invention was federally funded, the inventor is prompted to identify the federal agency, to submit the contract or grant number, to identify the principal investigator and title of the invention, so that when the IDF is submitted to the DTTD it goes to the correct agency automatically, and simultaneously whenever possible. Currently, only certain agencies, including the National Institutes of Health (NIH) and the National Aeronautics and Space Administration (NASA), have electronic systems for online reporting of government funded inventions to the federal agency that made the award. NIH's system is called IEDISON and be accessed online at www.iedison.gov. Reports can be submitted using IEDISON to various other agencies, including the Department of the Army, Centers for Disease Control, Department of Energy, Environmental Protection Agency, Food and Drug Administration, Navy/Office of Naval Research, National Institutes of Health, National Institute of Standards and Technology, Nation Ocean and Atmospheric Agency, National Science Foundation, United States Air Force, and United States Department of Agriculture. NASA's system, ENTRE, is accessible online at www.invention.nasa.gov. It is contemplated that the DTTD application 100 will generate reports in the appropriate format to be automatically uploaded via existing systems such as IEDISON and ENTRE. For federal agencies that do not accept electronic reports, the DTTD application 100 can automatically generate the appropriate form to be mailed. The DTTD application 100 maintains the contact information, including agency name, telephone number, email address and mailing address for federal agency contacts.

Ticklers also play a key role in managing compliance. Ticklers are reminders that the system automatically generates, or are entered manually by a user. For example, the DTTD application 100 can be configured to send reminders to the Local Administrator 118, beginning from the date of disclosure, up to 24 months later, to satisfy the deadline for the Election Requirement. All non-profit inventive entities that opt to own a federally funded invention must formally elect to take title to the invention, and this election must take place within two years from the disclosure date. Having the system remind administrators allows this to become an easily managed function.

Via the DTTD application 100, users can generate different data and status reports. The system is capable of displaying the same information in different readily available and translatable formats (e.g., .doc, .wpd, .rtf, .pdf, and the like), according to the needs of the user and organization. Status reports can be customized to include the number of disclosures submitted, the number of provisional patents filed, the number of non-provisional patents filed, the number of patents filed for each College or Department, the number of federally funded inventions, the number of inventions filed by students, etc.

Reports can also be used to manage invoices and expense notifications. For example, each time a government fee or attorney invoice is received or paid, the technology transfer administrator can be notified. Notifications can include at least the following information, but may include at least: the amount of the payment, the total expenses incurred for the year, total expenses paid for the year and the current balance.

It must be emphasized that the law does not require and it is economically prohibitive to illustrate and teach every possible embodiment of the present claims. Hence, the above-described embodiments are merely exemplary illustrations of implementations set forth for a clear understanding of the principles of the invention. Many variations and modifications may be made to the above-described embodiments without departing from the scope of the claims. All such modifications, combinations, and variations are included herein by the scope of this disclosure and the following claims.

What is claimed is:

1. A system for processing invention disclosure data, comprising:
    a central server;
    a processor operatively associated with the central server; and
    a non-transitory computer-readable medium on which are stored computer-executable instructions that, when executed, cause the central server to automatically perform the steps of:
        receiving invention data, the invention data including parameters selected from the group consisting of title, abstract, description, type, classification codes, invention date, date reduced to practice, purpose, publications, technology, inventor name, inventor citizenship, inventor title, intellectual property strategy, timing;

using the invention data to search external databases to identify prior art references;

assigning a score to the invention data, based at least in part on the number and relevance of prior art references identified in the search, the type of invention data, and the intellectual property strategy;

if the score meets or exceeds a predetermined threshold, then enabling receipt of said invention data by a designee for approval;

receiving service provider data for at least one service provider, the service provider data including at least two parameters selected from the group consisting of experience level, availability, certifications, industry ratings, technical expertise, services solicited, price, subscription level, resources;

prequalifying the service providers by matching the service provider data to the invention data, wherein matching comprises correlating the invention data with at all of the available parameters in the service provider data;

ranking the service providers based on the degree of correlation determined in the matching step;

receiving approval data, wherein if said approval data indicates the invention data has been approved, soliciting bids from prequalified service providers to perform work related to said invention data by:

publishing a request for service;

permitting the prequalified service providers to submit bids via the central server in response to publication of the request for service;

receiving bids from prequalified service providers; and based at least in part on the score, the bids, the service provider data and the invention data, selecting the service provider that should receive the invention data.

2. The system of claim 1, wherein the instructions further cause the central server to perform the step of:

permitting the selected service provider to collaborate with individuals associated with the invention data by exchanging information within the system via the central server.

3. The system of claim 2, wherein selecting a bid comprises enabling receipt of said invention data by the prequalified service provider associated with the selected bid.

4. The system of claim 2, wherein permitting the selected service provider to collaborate with individuals associated with the invention data comprises facilitating the exchange of billing data within the system via the central server.

5. The system of claim 2, wherein permitting the selected service provider to collaborate with individuals associated with the invention data comprises communicating due dates for actions associated with the work request.

6. The system of claim 1, wherein the instructions further cause the central server to perform the step of:

if the score fails to meet or exceed the predetermined threshold, then permitting revision of the invention data.

7. The system of claim 1, wherein permitting at least one of the prequalified service providers to submit a bid via the central server in response to publication of the request for service is based on the subscription level associated with the at least one prequalified service provider.

8. The system of claim 1, wherein the instructions further cause the central server to determine whether the invention data includes identification of a government agency, and if so, reporting receipt of the invention data to the governmental agency.

* * * * *